(12) United States Patent
Bishop et al.

(10) Patent No.: US 11,726,224 B2
(45) Date of Patent: Aug. 15, 2023

(54) B ANNULUS ACOUSTIC PRESSURE SENSING

(71) Applicants: David Bishop, Cypress, TX (US); Carlos Felipe Rivero, Katy, TX (US); James J. Freeman, Houston, TX (US); Roger Steinsiek, Pearland, TX (US); Marc Samuelson, Houston, TX (US); Shaela Rahman, Houston, TX (US); Jason Harris, Cypress, TX (US)

(72) Inventors: David Bishop, Cypress, TX (US); Carlos Felipe Rivero, Katy, TX (US); James J. Freeman, Houston, TX (US); Roger Steinsiek, Pearland, TX (US); Marc Samuelson, Houston, TX (US); Shaela Rahman, Houston, TX (US); Jason Harris, Cypress, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 762 days.

(21) Appl. No.: 16/690,873

(22) Filed: Nov. 21, 2019

(65) Prior Publication Data

US 2020/0241160 A1    Jul. 30, 2020

Related U.S. Application Data

(60) Provisional application No. 62/796,382, filed on Jan. 24, 2019.

(51) Int. Cl.
*G01V 1/46* (2006.01)
*G01L 19/00* (2006.01)
(Continued)

(52) U.S. Cl.
CPC ............ *G01V 1/46* (2013.01); *G01L 19/0092* (2013.01); *G01V 1/48* (2013.01); *G01V 1/52* (2013.01);
(Continued)

(58) Field of Classification Search
CPC .......... B63B 2211/02; B63G 2008/002; G01C 13/006; G01C 21/20; G01L 19/0092;
(Continued)

(56) References Cited

U.S. PATENT DOCUMENTS 5,341,345 A * 8/1994 Warner ................. E21B 47/085
367/902
6,618,322 B1 * 9/2003 Georgi .................. E21B 47/085
367/27
(Continued)

FOREIGN PATENT DOCUMENTS

WO    2011017419 A2    2/2011

OTHER PUBLICATIONS

Karlsen et al, Pressure Management under Arctic Operations, Arctic Technology Conference an OTC Event held in Houston, Texas, USA, Dec. 3-5, 2012. (Year: 2012).*
(Continued)

*Primary Examiner* — David L Singer
(74) *Attorney, Agent, or Firm* — Cantor Colburn LLP

(57) ABSTRACT

A method and apparatus for determining a pressure in an annulus between an inner casing and an outer casing. An acoustic transducer is disposed within the casing at a selected depth within the inner casing and is configured to generate an acoustic pulse and receive a reflection of the acoustic pulse from the inner casing. A time of flight is measured of the acoustic pulse to the inner surface of the inner casing. An inner diameter of the inner casing is determined from the time of flight. The pressure in the annulus is determined from the inner diameter. A processor can be used to measure time and determine inner diameter and annulus pressure.

15 Claims, 4 Drawing Sheets

(51) Int. Cl.
*G01V 1/48* (2006.01)
*G01V 1/52* (2006.01)

(52) U.S. Cl.
CPC .. *G01V 2001/526* (2013.01); *G01V 2210/121* (2013.01); *G01V 2210/1299* (2013.01); *G01V 2210/1429* (2013.01); *G01V 2210/54* (2013.01)

(58) Field of Classification Search
CPC .......... G01V 1/3843; G01V 1/46; G01V 1/48; G01V 1/52; G01V 2001/526; G01V 2210/121; G01V 2210/1299; G01V 2210/1429; G01V 2210/54; G05D 1/0692
See application file for complete search history.

(56) References Cited

U.S. PATENT DOCUMENTS

| | | | | |
|---|---|---|---|---|
| 2002/0070017 | A1* | 6/2002 | Soliman | E21B 28/00 166/249 |
| 2004/0095847 | A1* | 5/2004 | Hassan | G01H 5/00 367/25 |
| 2005/0223808 | A1* | 10/2005 | Myers | G01N 29/222 73/152.58 |
| 2006/0289155 | A1 | 12/2006 | Van Kuijk et al. | |
| 2009/0200079 | A1* | 8/2009 | Zaeper | E21B 47/08 175/48 |
| 2010/0258303 | A1* | 10/2010 | Alberty | E21B 47/08 175/48 |
| 2010/0263878 | A1* | 10/2010 | Van Nieuwkoop | E21B 43/103 166/384 |
| 2011/0114387 | A1 | 5/2011 | Belcher et al. | |
| 2012/0136577 | A1* | 5/2012 | Dria | E21B 47/007 702/11 |
| 2014/0174187 | A1* | 6/2014 | Borgen | G01K 11/22 73/597 |
| 2015/0177198 | A1 | 6/2015 | Thierry et al. | |
| 2016/0170063 | A1* | 6/2016 | Leggett | G01V 1/44 367/7 |
| 2017/0168183 | A1* | 6/2017 | Hayman | G01V 1/48 |
| 2017/0350234 | A1 | 12/2017 | Xia et al. | |
| 2018/0202285 | A1* | 7/2018 | Williams | E21B 44/00 |

OTHER PUBLICATIONS

International Search Report and Written Opinion for International Application No. PCT/US2019/064111; International Filing Date Dec. 3, 2019; dated Mar. 19, 2020; 9 Pages.

* cited by examiner

B ANNULUS ACOUSTIC PRESSURE SENSING

CROSS REFERENCE TO RELATED APPLICATION

This application claims the benefit of an earlier filing date from U.S. Provisional Application Ser. No. 62/796,382 filed Jan. 24, 2019, the entire disclosure of which is incorporated herein by reference.

BACKGROUND

In the resource recovery industry, one or more casings can be placed within a drilled wellbore in order to complete the wellbore for production. Often a plurality of casings are placed in the wellbore, thereby forming a plurality of annuli. An 'A' annulus is a void between a production string and a smallest casing string. A 'B' annulus is a void between the outer surface of the smallest casing string and the inner surface of the next smallest casing string. A pressure within the 'B' annulus indicates whether the 'B' annulus is filling with a fluid, indicating a leak into the 'B' annulus, requiring remedial action. Pressure sensors can be placed within the 'B' annulus to measure this pressure, but this requires additional technology and equipment.

SUMMARY

Disclosed herein is a method of determining a pressure in an annulus between an inner casing and an outer casing. The method includes: generating an acoustic pulse at an acoustic transducer disposed within the inner casing at a selected depth; measuring, at a processor, a time of flight of the acoustic pulse to an inner surface of the inner casing; determining, at the processor, an inner diameter of the inner casing from the time of flight; and determining, at the processor, the pressure in the annulus from the inner diameter.

Also disclosed herein is an apparatus for determining a pressure in an annulus between an inner casing and an outer casing. The apparatus includes an acoustic transducer and a processor. The acoustic transducer is disposed within the casing at a selected depth within the inner casing and is configured to generate an acoustic pulse and receive a reflection of the acoustic pulse from the inner casing. The processor is configured to measure a time of flight of the acoustic pulse, determine an inner diameter of the inner casing from the time of flight, and determine the pressure in the annulus from the inner diameter.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
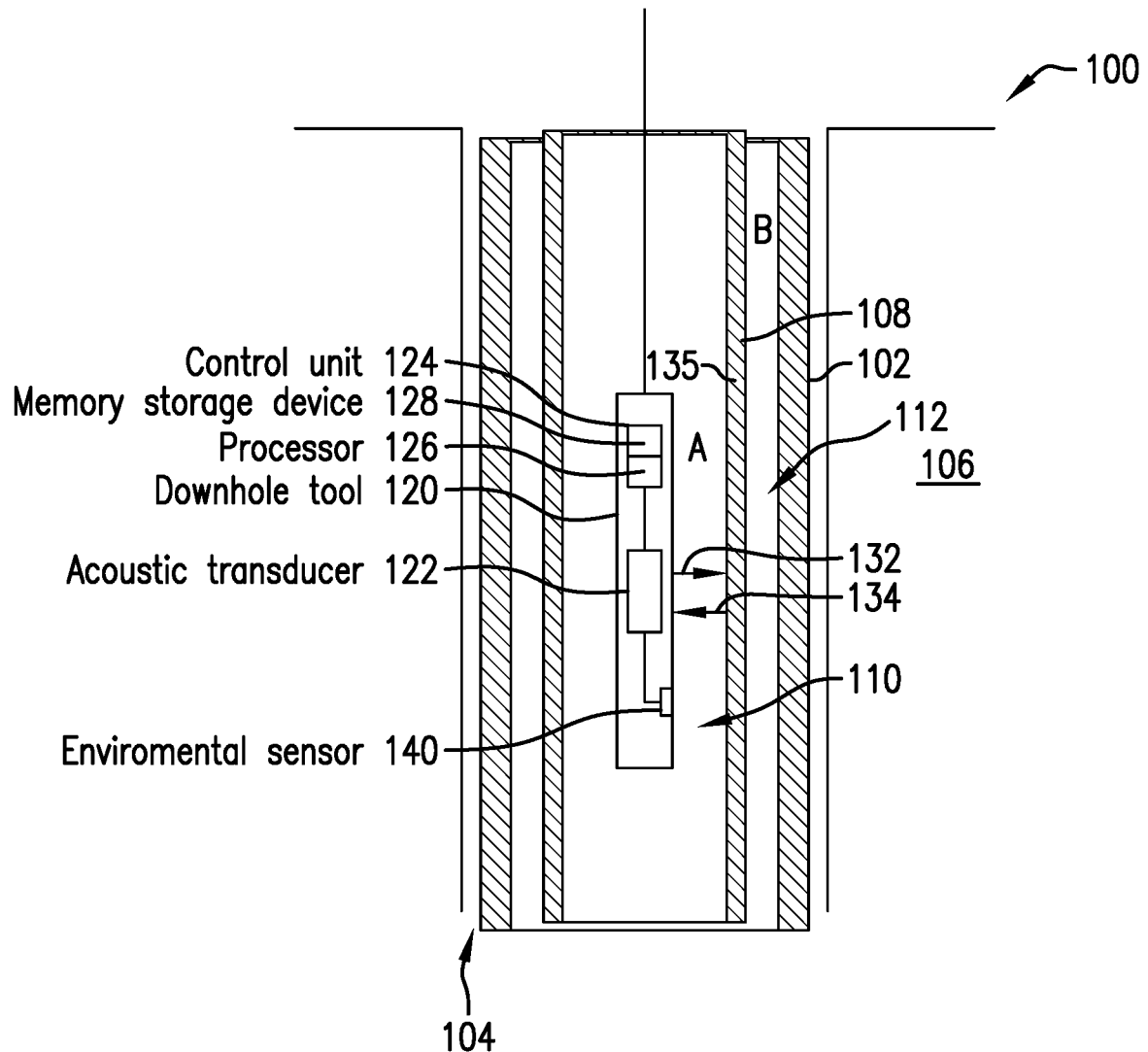
FIG. 1 shows an exemplary well casing system that is suitable for pressure testing of a 'B' annulus using the system and methods disclosed herein.

Referring to FIG. 1, an exemplary well casing system 100 is shown that is suitable for pressure testing of a 'B' annulus using the system and methods disclosed herein. The well casing system 100 includes an outer casing 102 disposed in a wellbore 104 formed in a formation 106. An inner casing 108 is disposed with in the outer casing 102. The inner casing 108 and outer casing 102 are tubular members having a longitudinal axis, with an outer diameter of the inner casing 108 being less than an inner diameter of the outer casing 102, so that positioning the inner casing 108 within the outer casing 102 forms an annulus. A downhole tool 120 is disposed within the inner casing 108. The downhole tool 120 and inner casing 108 form an annulus, referred to herein as the 'A' annulus 110. The inner casing 108 and the outer casing 102 form another annulus, referred to herein as the 'B' annulus 112. The 'B' annulus 112 can be an empty space or can be filled with cement or other material.

The pressure in the 'B' annulus 112 affects the inner diameter of the inner casing 108. As pressure in the B annulus increases, the inner casing 108 is compressed radially inward, decreasing the inner diameter. As pressure in the B annulus decreases, the inner casing 108 expands radially, increasing the inner diameter of the inner casing 108. Therefore, a measurement of the inner diameter, or a measurement of a change in inner diameter, can be used to determine the pressure, or a change in pressure, in the 'B' annulus 112. In various embodiments, the inner diameter of the inner casing 108 is indicative of a strain on the inner casing which can be used to calculate an inward force or pressure applied from the 'B' annulus.

As shown in FIG. 1, the downhole tool 120 is conveyed downhole using a wireline system. In alternate embodiments, the downhole tool 120 is conveyed downhole as part of a measurement-while-drilling system of a drill string. The downhole tool 120 can be used to make measurements of the inner diameter of the inner casing 108 and hence of 'B' annulus pressure. The downhole tool 120 includes an acoustic transducer 122 for generating and receiving acoustic pulses and a control unit 124. The control unit 124 includes a processor 126 and a memory storage device 128. The memory storage device 128 includes programs and/or instructions that, when accessed by the processor 126, enable the processor 126 to perform the methods disclosed herein for determining a pressure in the 'B' annulus as well as to perform an action based on the determined pressure in the 'B' annulus. A change in the pressure in the 'B' annulus can be used to detect a leak or flow of fluid from the formation into the 'B' annulus. Exemplary actions include, but are not limited to, notifying an operator, adjusting a pressure in the 'B' annulus, stopping or interrupting a downhole process, etc.

The acoustic transducer 122 is oriented to generate an acoustic pulse 132 along a radial direction of the inner casing 108. The acoustic pulse 132 interacts with an inner surface 135 of the inner casing 108 to create a reflected pulse 134 that is directed back to the acoustic transducer 122 and received at the acoustic transducer 122. In various embodiments, the control unit 124 activates the acoustic transducer 122 to generate the acoustic pulse 132 and records a time at which the acoustic pulse 132 is generated. The control unit 124 also records a reception time at which the acoustic transducer 122 receives the reflected pulse 134. The control unit 124 thus determines a time-of-flight of the acoustic pulse 132 from the acoustic transducer 122 to the inner surface 135 of the inner casing 108. The processor 126 then determines the distance from the acoustic transducer 122 to the inner surface 135 of the inner casing 108 from the time-of-flight using a velocity of sound ("sound speed") within the 'A' annulus 110. Alternatively, the processor 126 determines an inner diameter of the inner casing 108 from time-of-flight and sound speed.

In various embodiments, the downhole tool 120 includes an environmental sensor 140, such as a pressure sensor and/or a temperature sensor for use in determining a suitable sound speed. The environmental sensor 140 obtains environmental measurements, such as temperature and pressure in the 'A' annulus 110, that affect the speed of sound in the 'A' annulus 110. The environmental measurements are used to correct or adjust a sound speed under standard pressure and temperature conditions for pressure and/or temperature conditions in the 'A' annulus 110. The corrected sound speed is then used to determine the inner diameter of the inner casing 108 from the time-of-flight. The sensor 140 or a plurality of environmental sensors can also be placed in a location allowing determination of the effect of pressure and/or temperature in the downhole tool 120 and within the 'A' annulus 110 at the outer diameter of the downhole tool 120 as well as the inner diameter the inner casing 108. These pressures and temperatures can used along with the determined inner diameter of the inner casing 108 to determine the presence of pressure and/or fluid in the 'B' annulus 112.

In one embodiment, the processor 126 compares the measured inner diameter to a known inner diameter for the casing at a known 'B' annulus pressure and determines the 'B' annulus pressure related to the measured inner diameter from this comparison.

Figure 2:
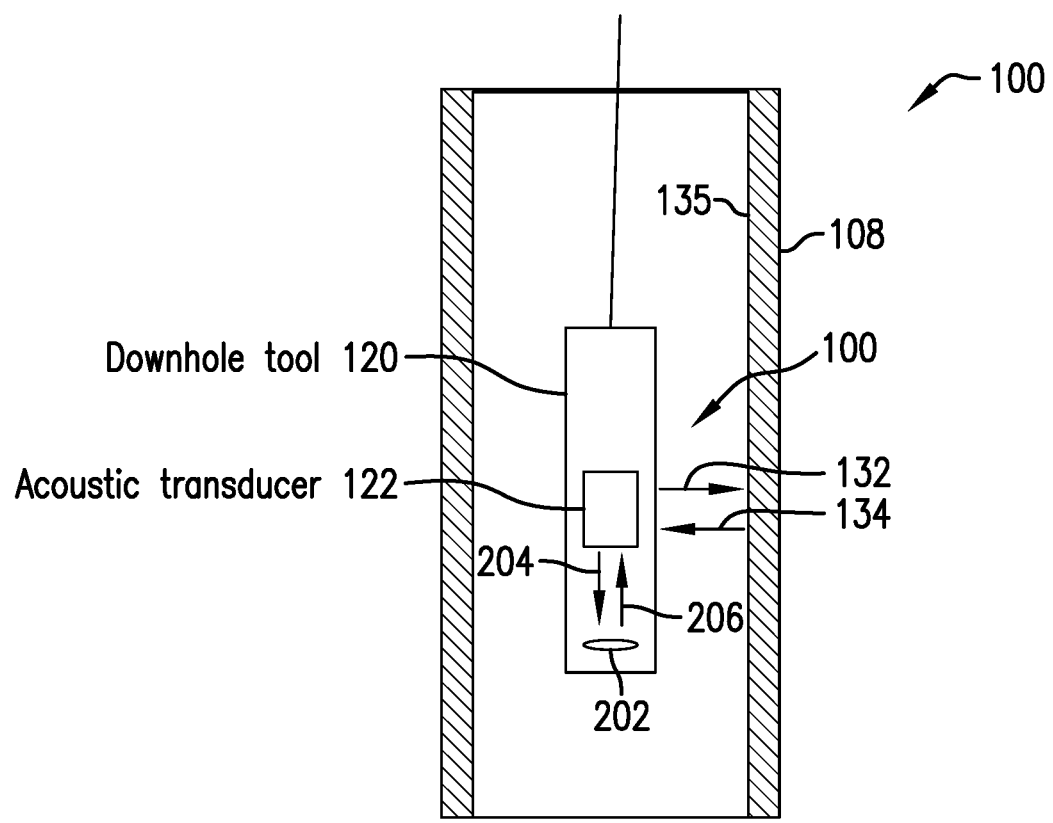
FIG. 2 shows another embodiment of the downhole tool including a calibration surface.

FIG. 2 shows another embodiment of the downhole tool 120 including a calibration surface 202. A calibration surface 202 is located at a pre-determined distance from the acoustic transducer 122. As shown in FIG. 2, the calibration surface 202 is at a pre-determined distance from the acoustic transducer 122 along the longitudinal axis of the downhole tool 120. However, the calibration surface 202 can be in any selected direction with respect to the acoustic transducer 122, in various embodiments. In order to calibrate the acoustic transducer 122, an acoustic calibration pulse 204 is propagated toward the calibration surface 202. In various embodiments, the acoustic transducer 122 can be reoriented between its orientation for testing the 'B' annulus and an orientation toward the calibration surface 202 for calibration purposes. The processor (126, FIG. 1) records the time at which the acoustic calibration pulse 204 is generated. The acoustic calibration pulse 204 interacts with the calibration surface 202 to form a calibration reflection pulse 206. The calibration reflection pulse 206 is received at the acoustic transducer 122, and the processor (126, FIG. 1) records the reception time. The reception time and generation time are used to determine a time-of-flight between the acoustic transducer 122 and the calibration surface 202. For calibration purposes, the signal path between the acoustic transducer 122 and the calibration surface 202 lies within borehole fluid or borehole gas. The downhole sound speed (in the 'A' annulus) is then determined using the determined time-of-flight and the known distance between the acoustic transducer 122 and the calibration surface 202. This downhole sound speed can then be used to determine the inner diameter of inner casing 108 using acoustic pulses 132 and 134.

Figure 3:
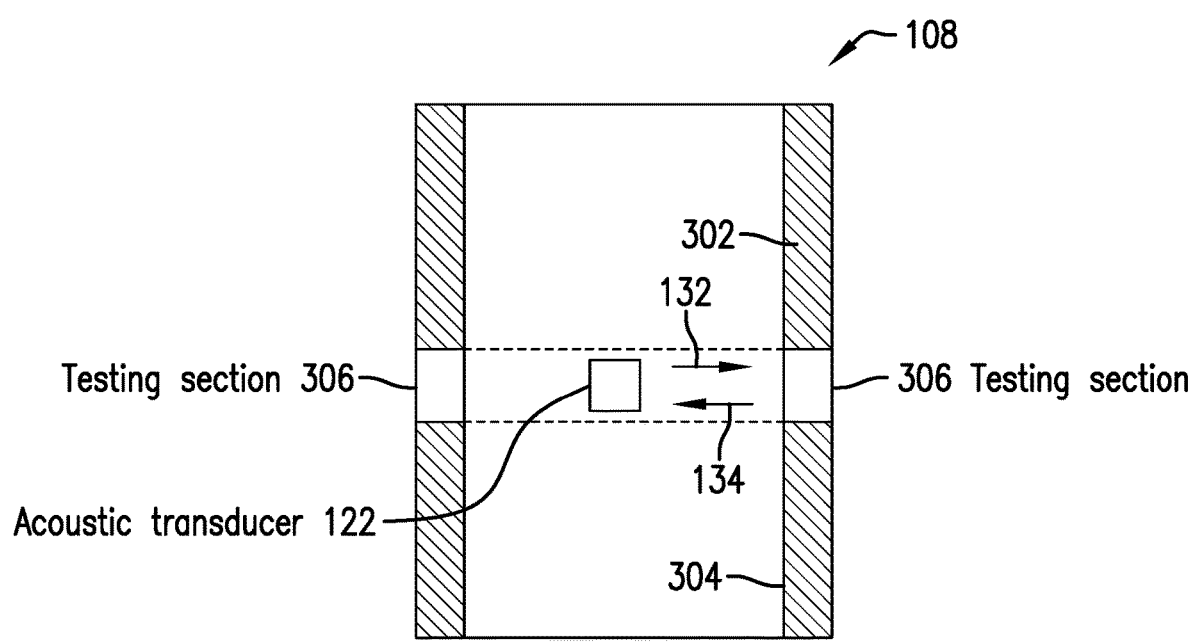
FIG. 3 shows a cross-sectional view of an inner casing having a section suitable for use with the acoustic transducer of the testing apparatus.

FIG. 3 shows a cross-sectional view of an inner casing 108 having a section suitable for use with the acoustic transducer of the testing apparatus. In the embodiment of FIG. 3, inner casing 108 includes casing sections 302 and 304 composed of standard casing material. Inner casing 108 further includes a testing section 306 between the casing section 302 and 304. The testing section 306 is made of a material having a known composition and having a tightly controlled inner diameter. The downhole tool is lowered into the inner casing 108 to a depth at which the acoustic transducer is at the same axial location as the testing section 306. The acoustic transducer 122 then generates acoustic pulse 132 in order to impinge on the testing section 306 and receives reflected pulse 134 from the testing section 306. Since the testing section 306 is used for determining the inner diameter and hence the pressure in the 'B' annulus, it is not necessary for the casing sections 302 and 304 to be machined to tightly controlled inner diameters. The inner surface of the testing section 306 can be hardened to increase an acoustic reflection coefficient of the surface, thereby increasing the strength or amplitude of the reflected pulse 134.

Figure 4:
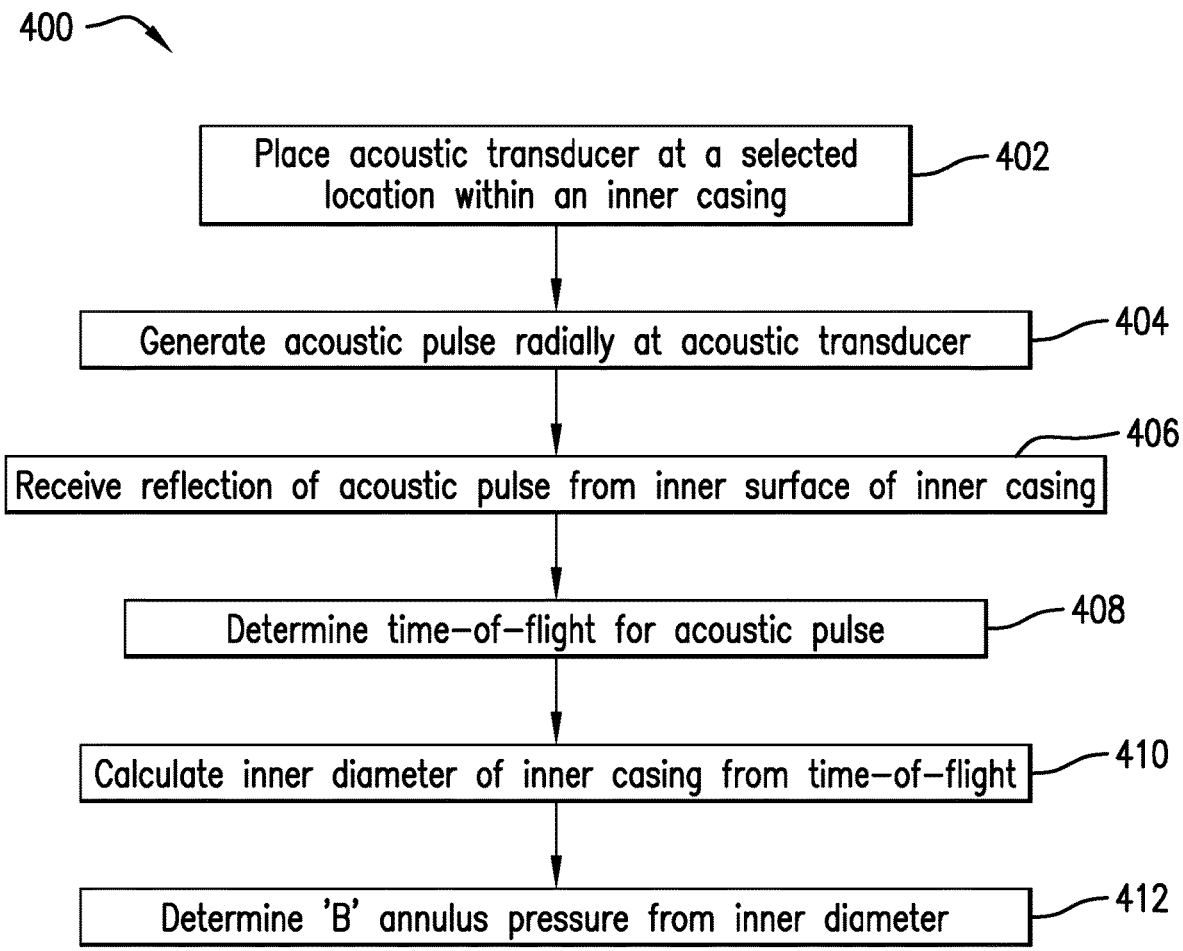
FIG. 4 show a flowchart illustrating a method for determining a pressure in a 'B' annulus of a casing.

FIG. 4 show a flowchart 400 illustrating a method for determining a pressure in a 'B' annulus of a casing. In box 402, an acoustic transducer is placed at a selected location within an inner casing 108, the inner casing 108 defining a radially inner surface of a 'B' annulus. In box 404, the acoustic transducer generates an acoustic pulse radially outward toward the inner surface of the inner casing 108, recording a generation time for the acoustic pulse. In box 406, the acoustic transducer receives a reflection of the acoustic pulse from the inner casing and records a reception time. In box 408 a time-of-flight is determined for the acoustic pulse. In box 410, the inner diameter of the inner casing is determined from the time-of-flight and a sound speed for the acoustic pulse. In box 412, the pressure is determined from the determined inner diameter of the inner casing.

Set forth below are some embodiments of the foregoing disclosure:

Embodiment 1

A method of determining a pressure in an annulus between an inner casing and an outer casing, comprising generating an acoustic pulse at an acoustic transducer disposed within the inner casing at a selected depth; measuring, at a processor, a time of flight of the acoustic pulse to an inner surface of the inner casing; determining, at the processor, an inner diameter of the inner casing from the time of flight; and determining, at the processor, the pressure in the annulus from the inner diameter.

Embodiment 2

The method of any prior embodiment, further comprising determining the inner casing from the time of flight and a sound speed in the inner casing.

Embodiment 3

The method of any prior embodiment, further comprising compensating a standard sound speed for environmental conditions within the casing to obtain the sound speed in the inner casing.

Embodiment 4

The method of any prior embodiment, wherein the environmental conditions includes at least one of: (i) a pressure in the inner casing; (ii) a temperature within the inner casing; (iii) a pressure in a downhole tool housing the acoustic transducer; and (iv) a temperature in the downhole tool.

Embodiment 5

The method of any prior embodiment, further comprising determining an effect of at least one of the pressures and temperatures on at least one of an outer diameter of the downhole tool and an inner diameter of the inner casing.

Embodiment 6

The method of any prior embodiment, further comprising determining the sound speed within the inner casing by measuring a time of flight for a calibration acoustic pulse reflected from a surface at a known distance from the acoustic transducer.

Embodiment 7

The method of any prior embodiment, further comprising directing the acoustic pulse at a machined section of the casing at the selected depth, having a known inner diameter.

Embodiment 8

The method of any prior embodiment, wherein the machined section includes a surface hardened to enhance an amplitude of a reflection of the acoustic pulse.

Embodiment 9

An apparatus for determining a pressure in an annulus between an inner casing and an outer casing, comprising: an acoustic transducer disposed within the casing at a selected depth within the inner casing, the acoustic transducer configured to generate an acoustic pulse and receive a reflection of the acoustic pulse from the inner casing; and a processor configured to: measure a time of flight of the acoustic pulse; determine an inner diameter of the inner casing from the time of flight; and determine the pressure in the annulus from the inner diameter.

Embodiment 10

The apparatus of any prior embodiment, wherein the processor is further configured to determine the inner casing from the time of flight and a sound speed in the inner casing.

Embodiment 11

The apparatus of any prior embodiment, wherein the processor is further configured to compensate a standard sound speed for environmental conditions within the casing to obtain the sound speed in the inner casing.

Embodiment 12

The apparatus of any prior embodiment, wherein the environmental conditions includes at least one of: (i) a pressure within the inner casing; (ii) a temperature within the inner casing; (iii) a pressure in a downhole tool housing the acoustic transducer; and (iv) a temperature in the downhole tool.

Embodiment 13

The apparatus of any prior embodiment, wherein the acoustic transducer propagates a calibration acoustic pulse at a surface at a known distance from the acoustic transducer and the processor is further configured to determine the sound speed within the inner casing by measuring the time of flight for the calibration acoustic pulse.

Embodiment 14

The apparatus of any prior embodiment, wherein the casing comprises a machined section having a known inner diameter at the selected depth.

Embodiment 15

The apparatus of any prior embodiment, wherein the machined section includes a hardened surface for enhancing an amplitude of a reflection of the acoustic pulse.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:
1. A method of determining an am pressure in an annulus between an inner casing and an outer casing, comprising:
generating an acoustic pulse at an acoustic transducer disposed within the inner casing at a selected depth;

measuring, at a processor, a time of flight of the acoustic pulse to an inner surface of the inner casing;

determining, at the processor, an inner diameter of the inner casing from the time of flight;

a comparing, at the processor, the determined inner diameter to a known inner diameter for the inner casing at a known annulus pressure to determine the annulus pressure related to the determined inner diameter; and detecting a flow of fluid from a formation into the annulus based on the annulus pressure.

2. The method of claim 1, further comprising determining the inner diameter of the inner casing from the time of flight and a sound speed in the inner casing.

3. The method of claim 2, further comprising compensating a standard sound speed for environmental conditions within the inner casing to obtain the sound speed in the inner casing.

4. The method of claim 3, wherein the environmental conditions include at least one of: (i) a pressure in the inner casing; (ii) a temperature within the inner casing; (iii) a pressure in a downhole tool housing the acoustic transducer; and (iv) a temperature in the downhole tool.

5. The method of claim 4, further comprising determining an effect of at least one of the pressures and temperatures on at least one of an outer diameter of the downhole tool and the inner diameter of the inner casing.

6. The method of claim 2, further comprising determining the sound speed within the inner casing by measuring the time of flight for a calibration acoustic pulse reflected from a surface at a known distance from the acoustic transducer.

7. The method of claim 1, further comprising directing the acoustic pulse at a machined section of the inner casing at the selected depth, having a known inner diameter.

8. The method of claim 7, wherein the machined section includes a surface hardened to enhance an amplitude of a reflection of the acoustic pulse.

9. An apparatus for determining an annulus pressure in an annulus between an inner casing and an outer casing, comprising:

an acoustic transducer disposed within the casing at a selected depth within the inner casing, the acoustic transducer configured to generate an acoustic pulse and receive a reflection of the acoustic pulse from the inner casing; and a processor configured to:

measure a time of flight of the acoustic pulse;

determine an inner diameter of the inner casing from the time of flight;

compare the determined inner diameter to a known inner diameter for the inner casing at a known annulus pressure to determine the annulus pressure related to the determined inner diameter; and detect a flow of fluid from a formation into the annulus based on the annulus pressure.

10. The apparatus of claim 9, wherein the processor is further configured to determine the inner diameter of the inner casing from the time of flight and a sound speed in the inner casing.

11. The apparatus of claim 10, wherein the processor is further configured to compensate a standard sound speed for environmental conditions within the inner casing to obtain the sound speed in the inner casing.

12. The apparatus of claim 11, wherein the environmental conditions includes at least one of: (i) a pressure within the inner casing; (ii) a temperature within the inner casing; (iii) a pressure in a downhole tool housing the acoustic transducer; and (iv) a temperature in the downhole tool.

13. The apparatus of claim 10, wherein the acoustic transducer propagates a calibration acoustic pulse at a surface at a known distance from the acoustic transducer and the processor is further configured to determine the sound speed within the inner casing by measuring the time of flight for the calibration acoustic pulse.

14. The apparatus of claim 9, wherein the inner casing comprises a machined section having a known inner diameter at the selected depth.

15. The apparatus of claim 14, wherein the machined section includes a hardened surface for enhancing an amplitude of the reflection of the acoustic pulse.

* * * * *